United States Patent
Ji et al.

(10) Patent No.: US 10,976,605 B2
(45) Date of Patent: Apr. 13, 2021

(54) PICTURE COMPENSATION METHOD AND APPARATUS, DISPLAY DEVICE AND NON-TRANSITORY COMPUTER-READABLE STORAGE MEDIUM

(71) Applicants: Beijing BOE Optoelectronics Technology Co., Ltd., Beijing (CN); BOE Technology Group Co., Ltd., Beijing (CN)

(72) Inventors: Zhihua Ji, Beijing (CN); Tiankuo Shi, Beijing (CN); Xiaomang Zhang, Beijing (CN); Yifang Chu, Beijing (CN); Yilang Sun, Beijing (CN); Chuanjun Liu, Beijing (CN); Xin Duan, Beijing (CN); Lingyun Shi, Beijing (CN); Yue Li, Beijing (CN); Yifan Hou, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/655,371

(22) Filed: Oct. 17, 2019

(65) Prior Publication Data
US 2020/0225537 A1 Jul. 16, 2020

(30) Foreign Application Priority Data
Jan. 15, 2019 (CN) .......................... 201910036788.4

(51) Int. Cl.
*G02F 1/1335* (2006.01)
*H05B 33/08* (2020.01)
(Continued)

(52) U.S. Cl.
CPC .. *G02F 1/133606* (2013.01); *G02F 1/133611* (2013.01); *H05B 45/10* (2020.01)

(58) Field of Classification Search
CPC ............... G09G 3/3406; G09G 3/3607; G09G 2320/062
See application file for complete search history.

(56) References Cited

U.S. PATENT DOCUMENTS

| 2010/0053066 A1* | 3/2010 | Nonaka ................ G09G 3/3426 345/102 |
| 2014/0085360 A1 | 3/2014 | Ohno et al. |

(Continued)

FOREIGN PATENT DOCUMENTS

| CN | 106328071 A | 1/2017 |
| CN | 108538260 A | 9/2018 |
| CN | 108665866 A | 10/2018 |

OTHER PUBLICATIONS

First office action of Chinese application No. 201910036788.4 dated Dec. 18, 2019.

*Primary Examiner* — Md Saiful A Siddiqui
(74) *Attorney, Agent, or Firm* — Fay Sharpe LLP

(57) ABSTRACT

A picture compensation method and apparatus, a display device and a non-volatile computer-readable storage medium are disclosed. The method includes: partitioning light-emitting devices in a plurality of first partitions based on information of the plurality of first partitions of a backlight source to obtain a plurality of second partitions, wherein the first partition includes a plurality of synchronously controlled light-emitting devices, and the number of rows and the number of columns of light-emitting devices in each of the plurality of second partitions are equal; fitting a luminance diffusion curve of each of the plurality of second partitions based on a luminance diffusion curve of each light-emitting device in each of the plurality of second (Continued)

partitions; determining a backlight value of a pixel unit corresponding to each pixel on a display panel based on the luminance diffusion curve of each of the plurality of second partitions and a gray-scale value of each pixel of an input image; and compensating for a picture of the input image based on the backlight value of each pixel unit.

18 Claims, 10 Drawing Sheets

(51) Int. Cl.
  *G02F 1/13357* (2006.01)
  *H05B 45/10* (2020.01)

(56) References Cited

U.S. PATENT DOCUMENTS

| | | |
|---|---|---|
| 2018/0157121 A1* | 6/2018 | Matsuura .......... G02F 1/133603 |
| 2018/0350308 A1* | 12/2018 | Zhang ................ G09G 3/3426 |
| 2019/0353961 A1* | 11/2019 | Ji ........................ G09G 3/3406 |
| 2020/0027408 A1 | 1/2020 | Xi et al. |

* cited by examiner

PICTURE COMPENSATION METHOD AND APPARATUS, DISPLAY DEVICE AND NON-TRANSITORY COMPUTER-READABLE STORAGE MEDIUM

CROSS-REFERENCE TO RELATED APPLICATION

This application claims priority to Chinese Patent Application No. 201910036788.4, filed on Jan. 15, 2019 and entitled "PICTURE COMPENSATION METHOD AND APPARATUS, DISPLAY DEVICE AND COMPUTER-READABLE STORAGE MEDIUM", the entire contents of which are incorporated herein by reference.

TECHNICAL FIELD

The present disclosure relates to the field of display technology, and in particular, relate to a picture compensation method and apparatus, a display device and a non-transitory computer-readable storage medium.

BACKGROUND

Backlight luminance may be changed in real time by a local dynamic dimming algorithm when a liquid crystal display adopts a direct-lit dot matrix backlight source. Thus, backlight power consumption is reduced and image quality contrast is improved.

SUMMARY

Embodiments of the present disclosure provide a picture compensation method and apparatus, a display device and a non-transitory computer-readable storage medium.

In a first aspect, embodiments of the present disclosure provide a picture compensation method. The method includes:

acquiring information of a plurality of first partitions of a backlight source of a display device, wherein the first partition includes a plurality of synchronously controlled light-emitting devices of which the number of rows and the number of columns are not equal, and the information of the first partition at least includes information of the number of rows and information of the number of columns of the light-emitting devices in the first partition;

partitioning the light-emitting devices of the plurality of first partitions based on the information of the plurality of first partitions to obtain a plurality of second partitions, wherein the number of rows and the number of columns of light-emitting devices in each of the plurality of second partitions are equal;

acquiring a gray-scale value of each pixel of an input image of the display device and a luminance diffusion curve of each light-emitting device in each of the plurality of first partitions;

fitting a luminance diffusion curve of each of the plurality of second partitions based on the luminance diffusion curve of each light-emitting device in each of the plurality of first partitions;

determining a backlight value of a pixel unit corresponding to each pixel on a display panel based on the luminance diffusion curve of each of the plurality of second partitions and the gray-scale value of each pixel of the input image; and compensating for a picture of the input image based on the backlight value of each pixel unit.

In a possible implementation manner according to embodiments of the present disclosure, the partitioning the light-emitting devices of the plurality of first partitions based on the information of the plurality of first partitions to obtain a plurality of second partitions includes:

determining the number of rows and the number of columns of light-emitting devices in each of the plurality of first partitions based on the information of the corresponding first partition; and re-partitioning the light-emitting devices in the plurality of first partitions by taking any of a greatest common divisor and a least common multiple of the number of rows and the number of columns of the light-emitting devices in the first partition as the number of rows and the number of columns of the light-emitting devices in the second partition.

Optionally, the re-partitioning the light-emitting devices in the plurality of first partitions by taking any of a greatest common divisor and a least common multiple of the number of rows and the number of columns of the light-emitting devices in the first partitions as the number of rows and the number of columns of the light-emitting devices in the second partition is implemented by any of the following means:

partitioning the light-emitting devices in the first partition into the plurality of second partitions by taking the greatest common divisor as the number of rows and the number of columns of the light-emitting devices in the second partition;

partitioning the light-emitting devices in the first partition into the plurality of second partitions by taking the greatest common divisor as the number of rows and the number of columns of the light-emitting devices in the second partition when the greatest common divisor is not 1;

integrating the light-emitting devices in the plurality of first partitions into one of the second partitions by taking the least common multiple as the number of rows and the number of columns of the light-emitting devices in the second partition when the greatest common divisor is 1;

integrating the light-emitting devices in the plurality of first partitions into one of the second partitions by taking the least common multiple as the number of rows and the number of columns of the light-emitting devices in the second partition if the least common multiple is not greater than a threshold when the greatest common divisor is 1; and partitioning the light-emitting devices in the first partitions into the plurality of second partitions by taking the greatest common divisor as the number of rows and the number of columns of the light-emitting devices in the second partitions if the least common multiple is greater than the threshold when the greatest common divisor is 1.

In a possible implementation manner according to embodiments of the present disclosure, the fitting a luminance diffusion curve of each of the plurality of second partitions based on the luminance diffusion curve of each light-emitting device in each of the plurality of first partitions includes:

directly taking a luminance diffusion curve of the single light-emitting device as a luminance diffusion curve of the second partition when the number of rows and the number of columns of the light-emitting devices in the second partition are equal to 1; and superimposing the luminance diffusion curves of all the light-emitting devices in the second partition to obtain a luminance diffusion curve of the second partition when the number of rows and the number of columns of the light-emitting devices in the second partition are not equal to 1.

Optionally, the superimposing the luminance diffusion curves of all the light-emitting devices in the second partition to obtain a luminance diffusion curve of the second partition when the number of rows and the number of columns of the light-emitting devices in the second partition are not equal to 1 includes:

in columns, superimposing the luminance diffusion curves of the single light-emitting devices in each column to obtain a luminance diffusion curve of each column of light-emitting devices; and superimposing the luminance diffusion curve of each column of light-emitting devices based on a distance between the centers of the corresponding column oflight-emitting devices and the second partition to obtain the luminance diffusion curve of the second partition.

In a possible implementation manner according to embodiments of the present disclosure, the determining a backlight value of a pixel unit corresponding to each pixel on a display panel based on the luminance diffusion curve of each of the plurality of second partitions and the gray-scale value of each pixel of the input image includes:

determining a luminance value of each of the plurality of second partitions of the backlight source based on a gray-scale value of each pixel of the input image;

for each pixel in the input image, determining a distance between the center of each of the plurality of second partitions and the pixel unit, and determining a weight value of each of the plurality of second partitions in the backlight value of the pixel unit based on the luminance diffusion curve of each of the plurality of second partitions and the distance between the center of each of the plurality of second partitions and the pixel unit; and calculating a backlight value of the pixel unit corresponding to each pixel on the display panel based on the luminance value of each of the plurality of second partitions of the backlight source and the weight value of each of the plurality of second partitions in the backlight value of each pixel unit.

In a possible implementation manner according to embodiments of the present disclosure, the determining a weight value of each of the plurality of second partitions in the backlight value of the pixel unit based on the luminance diffusion curve of each of the plurality of second partitions and the distance between the center of each of the plurality of second partitions and the pixel unit includes:

based on a distance between the pixel unit and the center of the corresponding second partition, searching for a luminance value corresponding to the distance on the luminance diffusion curve of the corresponding second partition; and determining a weight value of the corresponding second partition in the backlight value of the pixel unit based on the searched luminance value.

In a possible implementation manner according to embodiments of the present disclosure, the compensating for a picture of the input image based on the backlight value of each pixel unit includes:

calculating a compensated gray-scale value of each pixel of the input image based on the gray-scale value of each pixel of the input image and the backlight value of each pixel unit, and controlling a display panel to display the input image based on the compensated gray-scale value of each pixel of the input image.

In a possible implementation manner according to embodiments of the present disclosure, the calculating a compensated gray-scale value of each pixel of the input image based on the gray-scale value of each pixel of the input image and the backlight value of each pixel unit includes calculating a compensated gray-scale value of each pixel of the input image based on the following formula:

$$V_{com}=V_{ori}\times(255/bl\_pix)^{1/2.2}, \text{ wherein}$$

$V_{ori}$ is the gray-scale value of the input image;

$V_{com}$ is the compensated gray-scale value of the pixel corresponding to $V_{ori}$; and b;_pix is the backlight value of the pixel unit corresponding to $V_{ori}$.

In a second aspect, embodiments of the present disclosure further provide a picture compensation apparatus. The apparatus includes:

an acquiring module, configured to acquire a gray-scale value of each pixel of an input image of a display device, information of a plurality of first partitions of a backlight source of the display device and a luminance diffusion curve of each light-emitting device in each of the plurality of first partitions, wherein the first partition includes a plurality of synchronously controlled light-emitting devices of which the number of rows and the number of columns are not equal, and the information of the first partition at least includes information of the number of rows and information of the number of columns of the light-emitting devices in the first partition;

a partitioning module, configured to partition the light-emitting devices in the plurality of first partitions to obtain a plurality of second partitions, wherein the number of rows and the number of columns of light-emitting devices in each of the plurality of second partitions are equal;

a fitting module, configured to, with regard to each of the plurality of second partitions, fit a luminance diffusion curve of each of the plurality of second partitions based on the luminance diffusion curve of each light-emitting device in each of the plurality of first partitions;

a determining module, configured to determine a backlight value of a pixel unit corresponding to each pixel on a display panel based on the luminance diffusion curve of each of the plurality of second partitions and the gray-scale value of each pixel of the input image; and a compensating module, configured to compensate for a picture of the input image based on the backlight value of each pixel unit.

In an implementation manner according to embodiments of the present disclosure, the partitioning module is configured to: determine the number of rows and the number of columns of the light-emitting devices in each of the plurality of first partitions based on the information of the corresponding first partition; and re-partition the light-emitting devices in the plurality of first partitions by taking any of a greatest common divisor and a least common multiple of the number of rows and the number of columns of the light-emitting devices in the first partitions as the number of rows and the number of columns of the light-emitting devices in the second partition.

In an implementation manner according to embodiments of the present disclosure, the fitting module is configured to: directly take the luminance diffusion curve of the single light-emitting device as a luminance diffusion curve of the second partition when the number of rows and the number of columns of the light-emitting devices in the second partition are equal to 1; and superimpose the luminance diffusion curves of all the light-emitting devices in the second partition to obtain a luminance diffusion curve of the second partition when the number of rows and the number of columns of the light-emitting devices in the second partition are not equal to 1.

In an implementation manner according to embodiments of the present disclosure, the determining module is configured to: determine a luminance value of each of the plurality of second partitions of the backlight source based on the gray-scale value of each pixel of the input image; for each pixel in the input image, determine a distance between the center of each of the plurality of second partitions and the pixel unit, and determine a weight value of each of the plurality of second partitions in the backlight value of the pixel unit based on the luminance diffusion curve of each of the plurality of second partitions and the distance between the center of each of the plurality of second partitions and the pixel unit; and calculate a backlight value of the pixel nit corresponding to each pixel on the display panel based on the luminance value of each of the plurality of second partitions of the backlight source and the weight value of each of the plurality of second partitions in the backlight value of each pixel unit.

In an implementation manner according to embodiments of the present disclosure, the compensating module is configured to calculate a compensated gray-scale value of each pixel of the input image based on the gray-scale value of each pixel of the input image and the backlight value of each pixel unit, and control the display panel to display the input image based on the compensated gray-scale value of each pixel of the input image.

In an implementation manner according to embodiments of the present disclosure, the compensating module is configured to calculate a compensated gray-scale value of each pixel of the input image based on the following formula:

$$V_{com}=V_{ori}\times(255/bl\_pix)^{1/2.2}, \text{ wherein}$$

$V_{ori}$ is the gray-scale value of the input image;
$V_{com}$ is the compensated gray-scale value of the pixel corresponding to $V_{ori}$; and
bl_pix is the backlight value of the pixel unit corresponding to $V_{ori}$.

In a-third aspect, embodiments of the present disclosure further provide a display device.

The display device includes any of the picture compensation apparatuses according to the second aspect.

In a fourth aspect, embodiments of the present disclosure further provide an apparatus for use in picture compensation. The apparatus includes a processor and a memory configured to store an instruction executable by the processor. The processor is configured to perform any of the picture compensation methods according to the first aspect.

In a fifth aspect, embodiments of the present disclosure further provide a display device. The display device includes a processor, a memory configured to store an instruction executable by the processor and a display screen configured to display an image under control of the processor. The display screen is provided with a backlight source. The processor is configured to perform any of the picture compensation methods according to the first aspect.

In a sixth aspect, embodiments of the present disclosure further provide a non-transitory computer-readable storage medium, which stores instructions. The instructions, when being executed by a processor of a picture compensation apparatus, cause the picture compensation apparatus to perform any of the picture compensation methods according to the first aspect.

BRIEF DESCRIPTION OF THE DRAWINGS

FIG. 1 is a structural block diagram of another display device in accordance with an embodiment of the present disclosure.

DETAILED DESCRIPTION

The present disclosure is hereinafter described in further detail with reference to the accompanying drawings, to present the objects, technical solutions, and advantages of the present disclosure more clearly.

In the related art, a direct-lit dot matrix backlight source includes a plurality of light-emitting devices disposed in an array and is controlled by an integrated circuit (IC). In order to save hardware resources of the IC, the direct-lit dot matrix backlight source is divided into a plurality of partitions, each of which includes a plurality of light-emitting devices. The light-emitting devices in the same partition are synchronously controlled by the IC. For example, the light-emitting devices are started simultaneously and emit light with the same luminance.

The number of rows and the number of columns of the light-emitting devices in each partition are not equal. Accordingly, a pattern diffused by the luminance of the single partition is approximately elliptical, which causes that a luminance equipotential line of the single partition is approximately elliptical. Point spread functions (PSF) (namely, luminance spread curves) in all directions are different. That is, points which are equally distal from the center of the partition in different directions have different luminance. For example, two points, which are respectively on the major axis and the minor axis of an ellipse and kept equally distal from the center of the ellipse, have different luminance.

When a local dynamic dimming technology is adopted for picture compensation, the luminance of the light-emitting devices in each partition needs to be adjusted, in partitions, based on a gray-scale value of each pixel of an input image first. Then, picture compensation is performed based on the luminance of the light-emitting devices in each partition and the PSF of the corresponding partition. Since the PSFs of the single partition are different in all directions, it is difficult to accurately calculate the backlight luminance diffused in all directions. This increases the complexity in picture compensation, reduces the precision in picture compensation and finally adversely affects the overall display effect of the local dynamic dimming technology.

Figure 1:
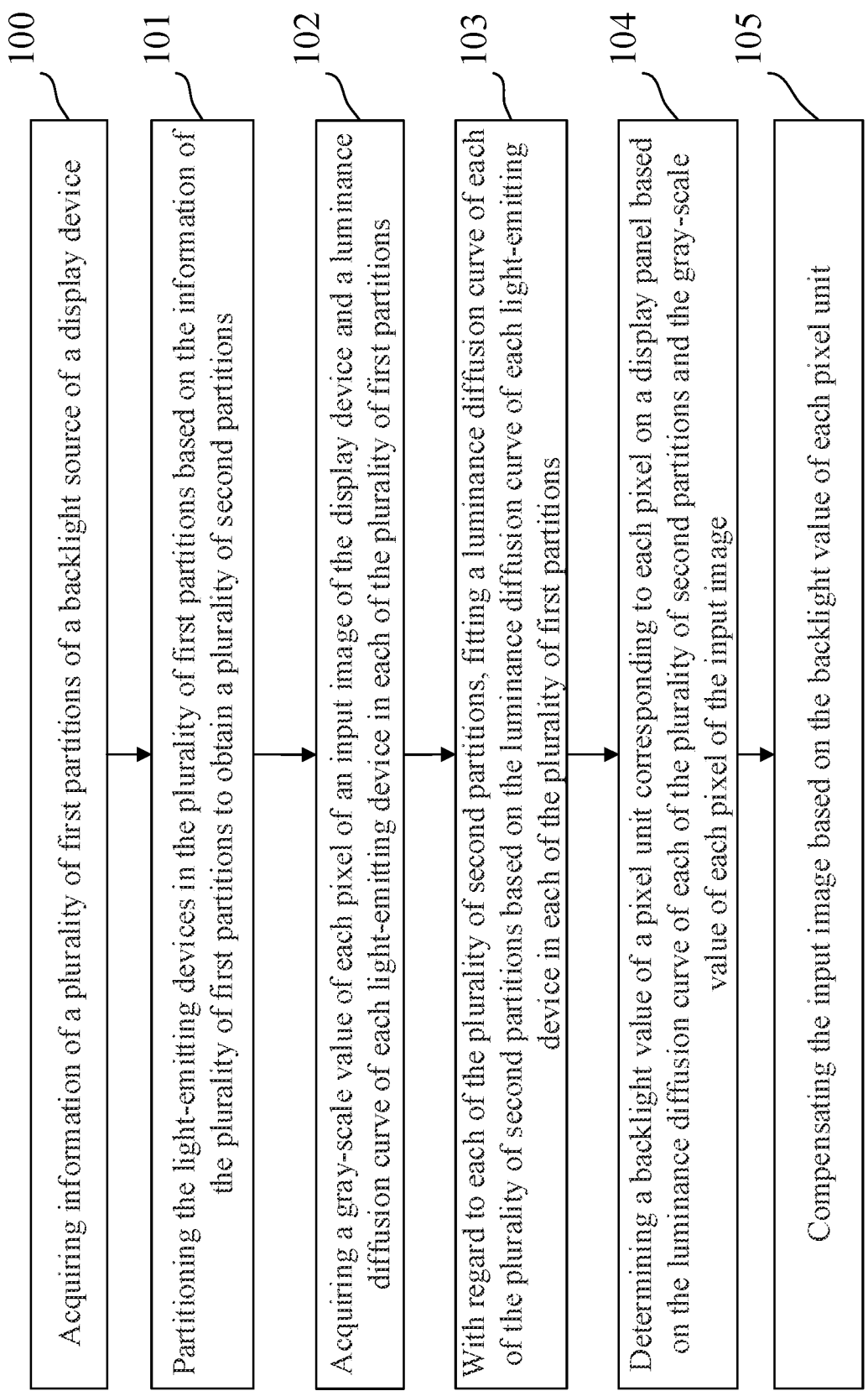
FIG. 1 is a flowchart of a picture compensation method in accordance with an embodiment of the present disclosure.

FIG. 1 is a flowchart of a picture compensation method in accordance with an embodiment of the present disclosure. Referring to FIG. 1, the picture compensation method includes the following steps.

In step 100, information of a plurality of first partitions of a backlight source of a display device is acquired.

In this embodiment, the display device may be a liquid crystal display. The backlight source of the display device may be a direct-lit dot matrix backlight source and includes a plurality of light-emitting devices disposed in an array. The light-emitting device may be partitioned into a plurality of first partitions.

Herein, the first partition includes a plurality of synchronously controlled light-emitting devices, which are controlled by the same signal of an IC. The plurality of light-emitting devices are at least controlled to be turned on or off simultaneously and to have the same luminance at the same time. The light-emitting devices may be lights, for example, LEDs. The phrase "a plurality of" here may refer to 2, 3, 4, or the like, which is not limited in the present disclosure. The numbers of the light-emitting devices in different first partitions may be the same or different. The number of rows and the number of columns of the light-emitting devices in each of the plurality of first partitions are not equal. For example, the number of rows is 2 and the number of columns is 4. Exemplarily, for ease of control, the numbers of rows of the light-emitting devices in the different first partitions are equal, and the numbers of columns of the light-emitting devices in the different first partitions are equal too.

The information of the first partitions at least includes information of the number of rows and information of the number of columns of the light-emitting devices in the first partitions. The information of the number of rows is to indicate the number of rows of the light-emitting devices in the first partitions. The information of the number of columns is to indicate the number of columns of the light-emitting devices in the first partitions. Exemplarily, the information of the first partitions may include the number of rows and the number of columns of the light-emitting devices in the first partitions. Alternatively, the information of the first partitions may further include locations of the light-emitting devices in the first partitions, for example, in which rows and columns the included light-emitting devices are disposed.

Exemplarily, the information of the first partitions may be pre-stored at a specified location. Correspondingly, step 100 may include reading the information of the first partitions from the specified location.

A luminance diffusion curve is to indicate the luminance of light emitted by the light-emitting devices at different distances around the light-emitting devices. The luminance diffusion curve of the single light-emitting device may be obtained based on shooting data of a color analyzer (for example, CA2000).

In step 101, the light-emitting devices in the plurality of first partitions are partitioned based on the information of the plurality of first partitions to obtain a plurality of second partitions.

In this step, the number of rows and the number of columns of the light-emitting devices in each of the plurality of second partitions are n, which is a positive integer.

Herein, the number of rows and the number of columns of the light-emitting devices in each of the plurality of second partitions are the same after partitioning in step 101. That is, n of each of the plurality of second partitions is equal. For example, the number of rows and the number of columns of the light-emitting devices in each of the plurality of second partitions are 2.

In step 102, a gray-scale value of each pixel of an input image of the display device and a luminance diffusion curve of each light-emitting device in each of the plurality of first partitions are acquired.

In step 103, with regard to each of the plurality of second partitions, a luminance diffusion curve of each of the plurality of second partitions is fitted based on the luminance diffusion curve of each light-emitting device in each of the plurality of first partitions.

The luminance diffusion curves of all the light-emitting devices in the second partition are superimposed to obtain the luminance diffusion curve of the second partition.

In this embodiment, since the number of rows and the number of columns of the light-emitting devices in the second partition are equal, a luminance equipotential line of the second partition is perfectly circular, and luminance diffusion curves of the second partition in all directions are the same.

In step 104, a backlight value of a pixel unit corresponding to each pixel on a display panel is determined based on the luminance diffusion curve of each of the plurality of second partitions and the gray-scale value of each pixel of the input image.

In this embodiment, the pixel refers to a point in the input image and is a part of the input image. The pixel unit refers to a display unit configured to display one pixel in the display panel and is a part of the display panel.

The backlight value of the pixel unit refers to a luminance value, at the pixel unit on the display panel, of light emitted by the backlight source.

The backlight value of the pixel unit for displaying each pixel on the display panel is determined by the luminance of the plurality of second partitions within a certain distance range around the corresponding location of the pixel unit on the backlight source. The degree to which the pixel unit is affected by the different second partitions, namely, the weights of the different second partitions in the backlight value of the pixel unit, may be determined based on the luminance diffusion curves of the second partitions. The backlight value of each pixel unit may be calculated based on the luminance of the light-emitting devices in the second partitions and the weights of the different second partitions in the backlight value of the pixel unit.

Herein, the certain distance range may be determined by the actual impact on the backlight value of the pixel unit from the second partitions at different distances. The certain distance range is negligible when the distances are relatively great and the impact is relatively small.

In step 105, the input image is compensated based on the backlight value of each pixel unit.

After the backlight value of each pixel unit is determined in step 104, a compensated gray-scale value of the pixel may be calculated based on the backlight value of each pixel unit and the gray-scale value of each pixel, and each display panel is controlled to operate based on the compensated gray-scale value of the pixel. For example, in a liquid crystal display, a deflection angle of a liquid crystal of each pixel may be controlled by the compensated gray-scale value of the pixel.

It should be noted that the sequence of step 100, step 101 and step 102 is not limited in this embodiment. Step 100, step 101 and step 102 may be sequentially performed, or step 102 is performed prior to step 100 and step 101, or step 101 may be performed after step 100 and step 102 are performed simultaneously as long as the gray-scale value of each pixel of the input image of the display device and the luminance diffusion curve of each light-emitting device in the second partition prior to step 103 may be obtained.

This embodiment provides the method for picture compensation when the luminance equipotential line of the single region is not perfectly circular. According to the method, the plurality of first partitions are partitioned based on the information of the plurality of first partitions, such that the number of rows and the number of columns of the light-emitting devices in the second partition are the same. Thus, the luminance equipotential line of the second partition is truly circular. The PSFs of the single partition are different in all directions. Therefore, the difficulty of a compensation algorithm is reduced. The accuracy of a compensation value and an overall display effect are improved.

Figure 2:
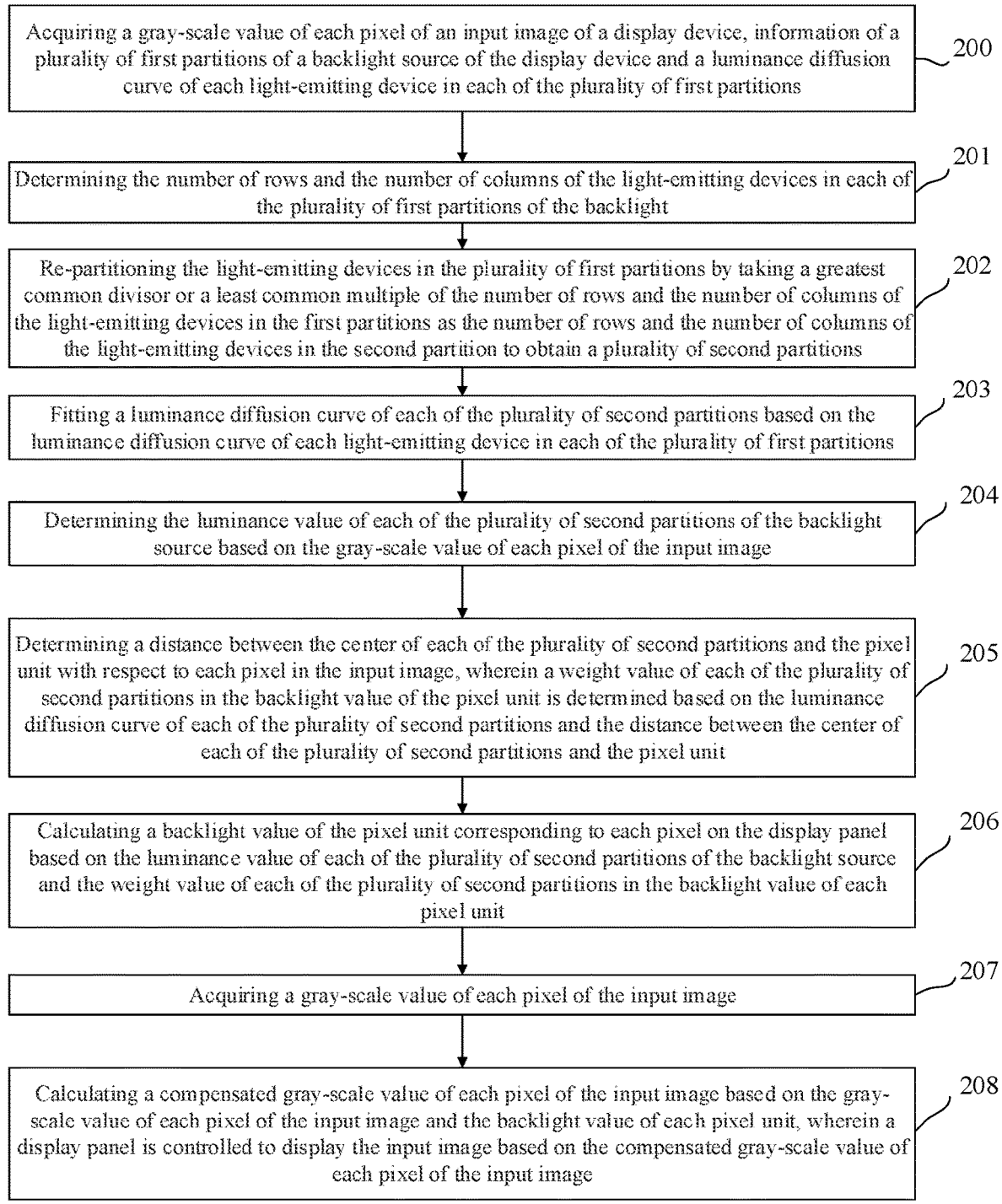
FIG. 2 is a flowchart of another picture compensation method in accordance with an embodiment of the present disclosure.

FIG. 2 is a flowchart of another picture compensation method in accordance with an embodiment of the present disclosure. Referring to FIG. 2, the method includes the following steps.

In step 200, a gray-scale value of each pixel of an input image of a display device, information of a plurality of first partitions of a backlight source of the display device and a luminance diffusion curve of each light-emitting device in each of the plurality of first partitions are acquired.

In this embodiment, the backlight source includes a plurality of light-emitting devices disposed in an array. The plurality of light-emitting devices may be partitioned into a plurality of first partitions.

The first partition includes a plurality of synchronously controlled light-emitting devices, which is controlled by the same signal of an IC. The plurality of light-emitting devices is at least controlled to be turned on/off simultaneously and to have the same luminance at the same time.

The light-emitting devices may be lights, for example, LEDs. The phrase "a plurality of" here may refer to 2, 3, 4, or the like, which is not limited in the present disclosure. The numbers of the light-emitting devices in different first partitions may be the same or different. The number of rows and the number of columns of the light-emitting devices in each of the plurality of first partitions are not equal. For example, the number of rows is 2 and the number of columns is 4. Exemplarily, for ease of control, the numbers of rows of the light-emitting devices in different first partitions are equal, and the numbers of columns of the light-emitting devices in different first partitions are equal too.

The information of the first-partitions at least includes information of the number of rows and information of the number of columns of the light-emitting devices in the first partitions. The information of the number of rows is to indicate the number of rows of the light-emitting devices in the first partitions. The information of the number of columns is to indicate the number of columns of the light-emitting devices in the first partitions. Exemplarily, the information of the first partitions may include the number of rows and the number of columns of the light-emitting devices in the first partitions. Alternatively, the information of the first partitions may further include locations of the light-emitting devices in the first partitions, for example, in which rows and columns the included light-emitting devices are.

Exemplarily, the information of the first partitions may be pre-stored at a specified location. Correspondingly, step 200 may include reading the information of the first partitions from the specified location.

A luminance diffusion curve is to indicate the luminance of light emitted by the light-emitting devices at different distances around the light-emitting devices. The luminance diffusion curve of the single light-emitting device may be obtained based on shooting data of a color analyzer (for example, CA2000).

In this embodiment, since the subsequent picture compensation requires the gray-scale value of each pixel of the input image, the information of the plurality of first partitions of the backlight source and the luminance diffusion curve of each light-emitting device of each of the plurality of first partitions, these parameters are acquired first in this step to prepare for the follow-up picture compensation.

In step 201, the number of rows and the number of columns of the light-emitting devices in each of the plurality of first partitions of the backlight are determined.

In this step, the number of rows and the number of columns of the light-emitting devices in each of the plurality of first partitions may be determined based on the information of the first partitions.

Figure 3:
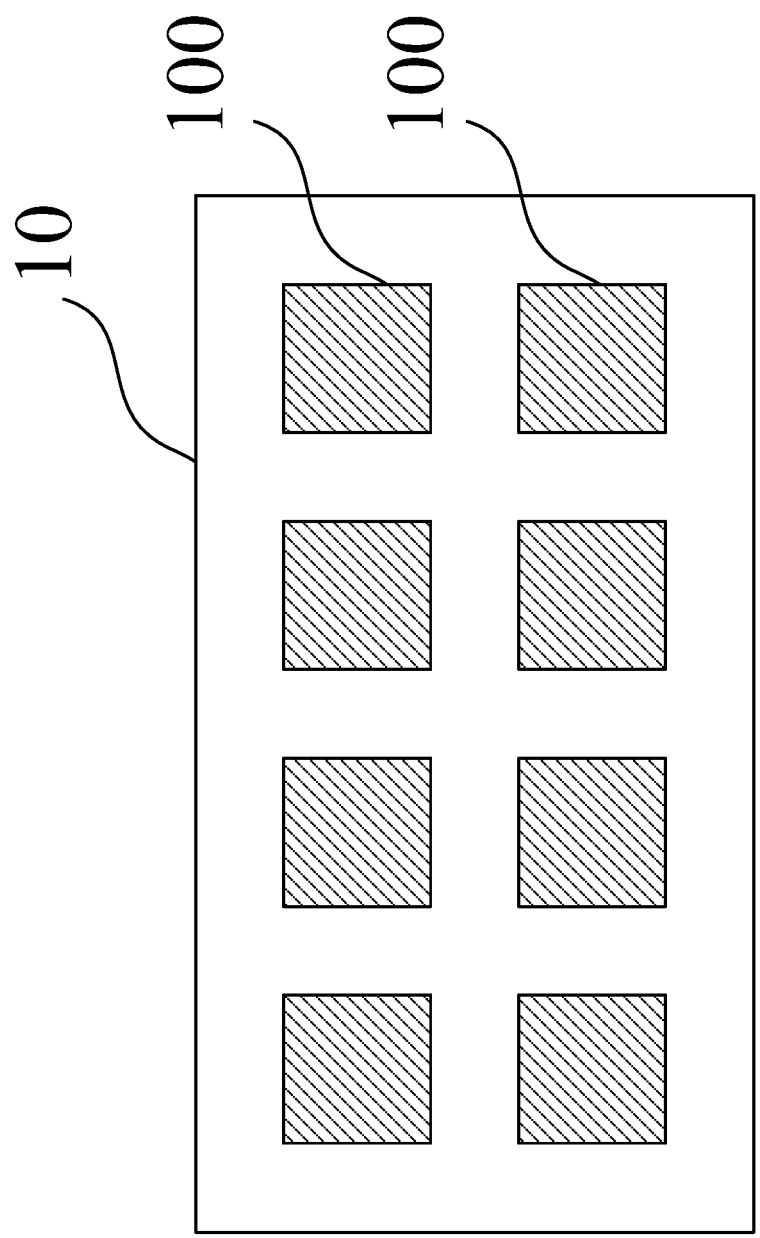
FIG. 3 is a schematic structural diagram of a first partition in accordance with an embodiment of the present disclosure.

FIG. 3 is a schematic structural diagram of a first partition in accordance with an embodiment of the present disclosure. As shown in FIG. 3, a plurality of light-emitting devices 100 is disposed in a first partition 10 and partitioned into 2 rows and 4 columns.

In step 202, the light-emitting devices in the plurality of first partitions are re-partitioned by taking a greatest common divisor or a least common multiple of the number of rows and the number of columns of the light-emitting devices in the first partitions as the number of rows and the number of columns of the light-emitting devices in the second partition to obtain a plurality of second partitions.

The number of rows and the number of columns of the light-emitting devices in each of the plurality of second partitions are n, which is a positive integer and is the greatest common divisor or the least common multiple of the number of rows and the number of columns.

Figure 4:
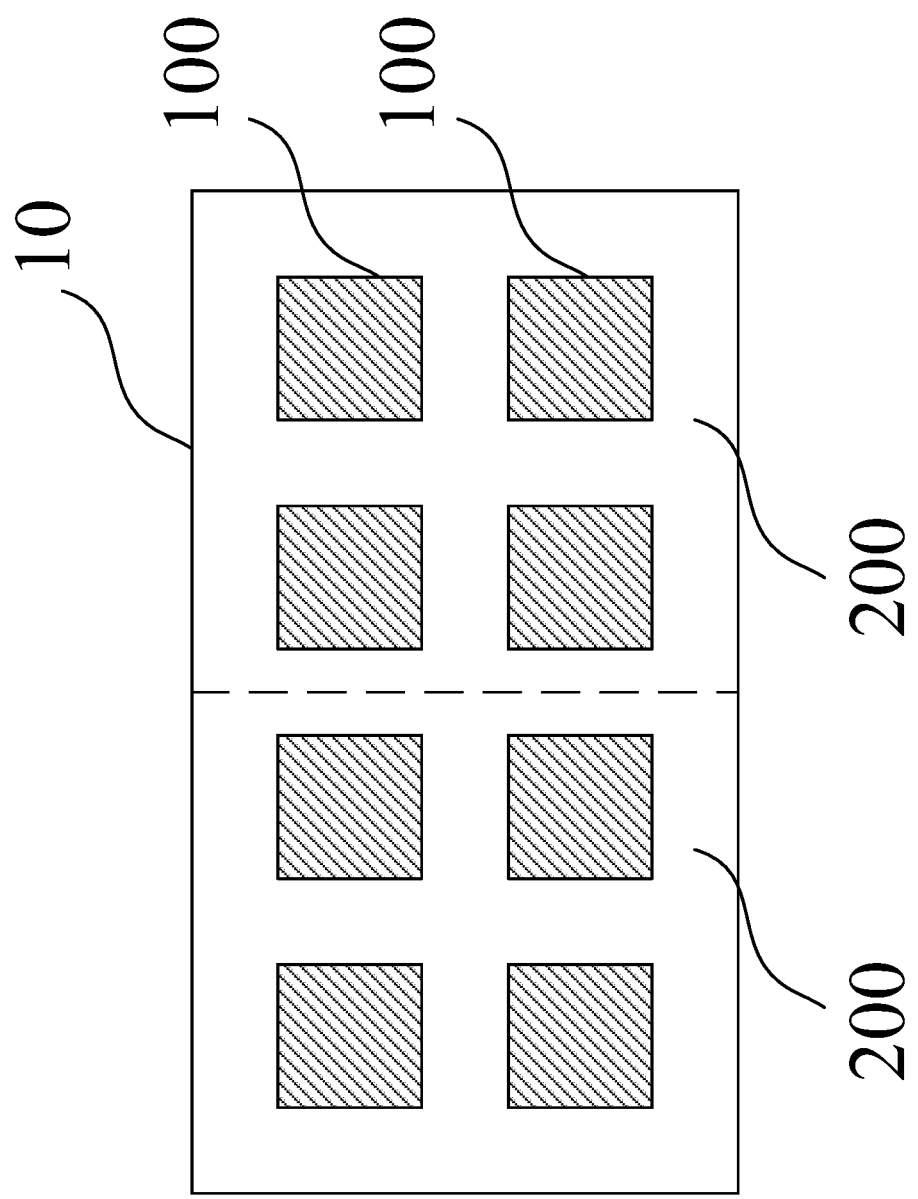
FIG. 4 is a schematic diagram of partitioning of a first partition in accordance with an embodiment of the present disclosure.

FIG. 4 is a schematic partitioning diagram of a first partition in accordance with an embodiment of the present disclosure. As shown in FIG. 4, in the first partition illustrated in FIG. 3, the number of rows and the number of columns are respectively 2 and 4. It thus may be determined that 2 second partitions 200 illustrated in FIG. 4 are obtained through re-partitioning by taking the greatest common divisor 2 as the number of rows and the number of columns of the light-emitting devices in the second partition, and the number of rows and the number of columns of the light-emitting devices in each of the plurality of second partitions are 2.

In this step, the light-emitting devices in the first partition are partitioned to obtain the second partition by choosing the greatest common divisor as the number of rows and the number of columns of the light-emitting devices in the second partition. When the greatest common divisor is 1, 1 may be chosen as the number of rows and the number of columns of the light-emitting devices in the second partition for partitioning, and the least common multiple may also be chosen as the number of rows and the number of columns of the light-emitting devices in the second partition for integration of the first partitions to obtain the second partition. By using the greatest common divisor or the least common multiple as the number of rows and the number of columns of the light-emitting devices in the second partition, partitioning and integration of the partitions may be reduced as much as possible. Thus, data required to be stored may be reduced. Further, a storage space is saved.

For example, the number of rows and the number of columns of the first partitions are respectively 2 and 3 and the greatest common divisor is 1. At this time, the least common multiple 6 may be used as the number of rows and the number of columns of the light-emitting devices in the second partition, and the light-emitting devices in the 6 first partitions are integrated into one second partition which includes 6 rows and 6 columns of light-emitting devices.

Optionally, during determination of the number of rows and the number of columns of the light-emitting devices in the second partition, if the greatest common divisor of the number of rows and the number of columns of the light-emitting devices in the first partition is 1, the least common multiple of the number of rows and the number of columns may be compared with a threshold. If the least common multiple is greater than the threshold, the greatest common divisor is used as the number of rows and the number of columns of the light-emitting devices in the second partition. If the least common multiple is not greater than the threshold, the least common multiple is used as the number of rows and the number of columns of the light-emitting devices in the second partition. Thus, the area of the second partition may not be too big. Further, the backlight control accuracy of the local dynamic dimming algorithm will not be affected.

That is, step 202 may be implemented by the following means.

In a first possible implementation manner, step 202 may include:

partitioning the light-emitting devices in the first partition into the plurality of second partitions by taking the greatest common divisor of the number of rows and the number of columns of the light-emitting devices in the first partition as the number of rows and the number of columns of the light-emitting devices in the second partition.

In a second possible implementation manner, step 202 may include:

partitioning the light-emitting devices in the first partition into the plurality of second partitions by taking the greatest common divisor as the number of rows and the number of columns of the light-emitting devices in the second partition when the greatest common divisor of the number of rows and the number of columns of the light-emitting devices in the first partition is not 1; or integrating the light-emitting devices in the plurality of first partitions into one second partition by taking the least common multiple of the number of rows and the number of columns of the light-emitting devices in the first partition as the number of rows and the number of columns of the light-emitting devices in the second partition when the greatest common divisor of the number of rows and the number of columns of the light-emitting devices in the first partition is 1.

In a third possible implementation manner, step 203 may include:

partitioning the light-emitting devices in the first partition into the plurality of second partitions by taking the greatest common divisor as the number of rows and the number of columns of the light-emitting devices in the second partition when the greatest common divisor of the number of rows and the number of columns of the light-emitting devices in the first partition is not 1; or integrating the light-emitting devices in the plurality of first partitions into one second partition by taking the least common multiple as the number of rows and the number of columns of the light-emitting devices in the second partition if the least common multiple of the number of rows and the number of columns of the light-emitting devices in the second partition is not greater than the threshold when the greatest common divisor of the number of rows and the number of columns of the light-emitting devices in the first partition is 1; or partitioning the light-emitting devices in the first partition into the plurality of second partitions by taking the greatest common divisor as the number of rows and the number of columns of the light-emitting devices in the second partition if the least common multiple of the number of rows and the number of columns of the light-emitting devices in the first partition is greater than the threshold when the greatest common divisor of the number of rows and the number of columns of the light-emitting devices in the first partition is 1.

By partitioning the light-emitting devices in the plurality of first partitions of the backlight source in step 201 and step 202, the light-emitting devices in each of the plurality of first partitions may be conveniently re-partitioned by this means. Meanwhile, the solution includes partitioning and integration, such that the luminance equipotential line of the second partition is perfectly circular.

In step 203, a luminance diffusion curve of each of the plurality of second partitions is fitted based on the luminance diffusion curve of each light-emitting device in each of the plurality of first partitions.

The luminance diffusion curves of all the light-emitting devices in the second partition are superimposed to obtain the luminance diffusion curve of the second partition.

In an implementation manner of this embodiment, step 203 may include the following sub-steps.

When n=1, the number of rows and the number of columns of the light-emitting devices in the second partition are equal to 1. That is, there is only one light-emitting device in the second partition. At this time, the luminance diffusion curve of the single light-emitting device is directly used as the luminance diffusion curve of the second partition.

When n≠1, the number of rows and the number of columns of the light-emitting devices in the second partition are not equal to 1. That is, a plurality of light-emitting devices are arranged in the second partition. At this time, the luminance diffusion curves of all the light-emitting devices in the second partition are superimposed to obtain the luminance diffusion curve of the second sub-region.

During partitioning, there may be two cases, one is that n=1 and the other is that n≠1. When n=1, the luminance diffusion curve of the single light-emitting device is directly used as the luminance diffusion curve of the second partition. When n≠1, the luminance diffusion curves of all the light-emitting devices in the second partition are superimposed to obtain the luminance diffusion curve of the second sub-region.

Optionally, the luminance diffusion curves of all the light-emitting devices in the second partition are superimposed to obtain the luminance diffusion curve of the second partition by the following steps:

in columns, superimposing the luminance diffusion curves of the single light-emitting devices in each column to obtain a luminance diffusion curve of each column of the light-emitting devices; and superimposing the luminance diffusion curve of each column of the light-emitting devices based on a distance between the centers of the corresponding column and the second partition to obtain the luminance diffusion curve of the second partition.

The superimposition process of the luminance diffusion curves is exemplarily described below with reference to FIGS. 5 and 6.

Figure 5:
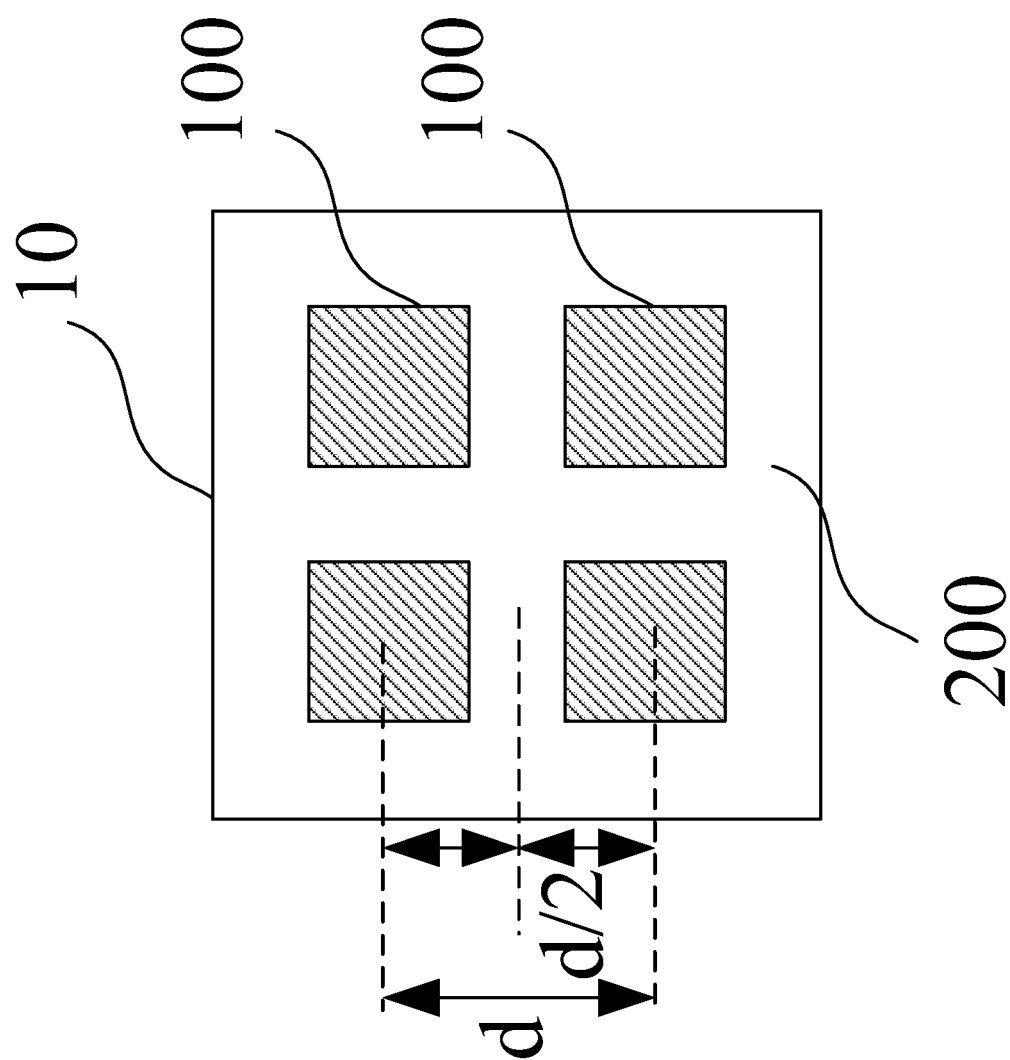
FIG. 5 is a schematic structural diagram of a second partition in accordance with an embodiment of the present disclosure.

FIG. 5 is a schematic structural diagram of a second partition in accordance with an embodiment of the present disclosure. As shown in FIG. 5, it is assumed that a center distance pitch between the adjacent light-emitting devices is equal to d (the center distance between the adjacent light-emitting devices in a horizontal direction and a vertical direction are d), luminance diffusion curves of two light-emitting device in one column are fitted and equivalent to the luminance diffusion curve of the light-emitting device at d/2 in FIG. 5. Fitting is performed by directly superimposing the luminance diffusion curves of the two light-emitting devices. Since the luminance diffusion curves of the two light-emitting devices are the same, the luminance diffusion curve of the light-emitting device is multiplied by 2 to obtain the luminance diffusion curve as shown in FIG. 6.

Figure 6:
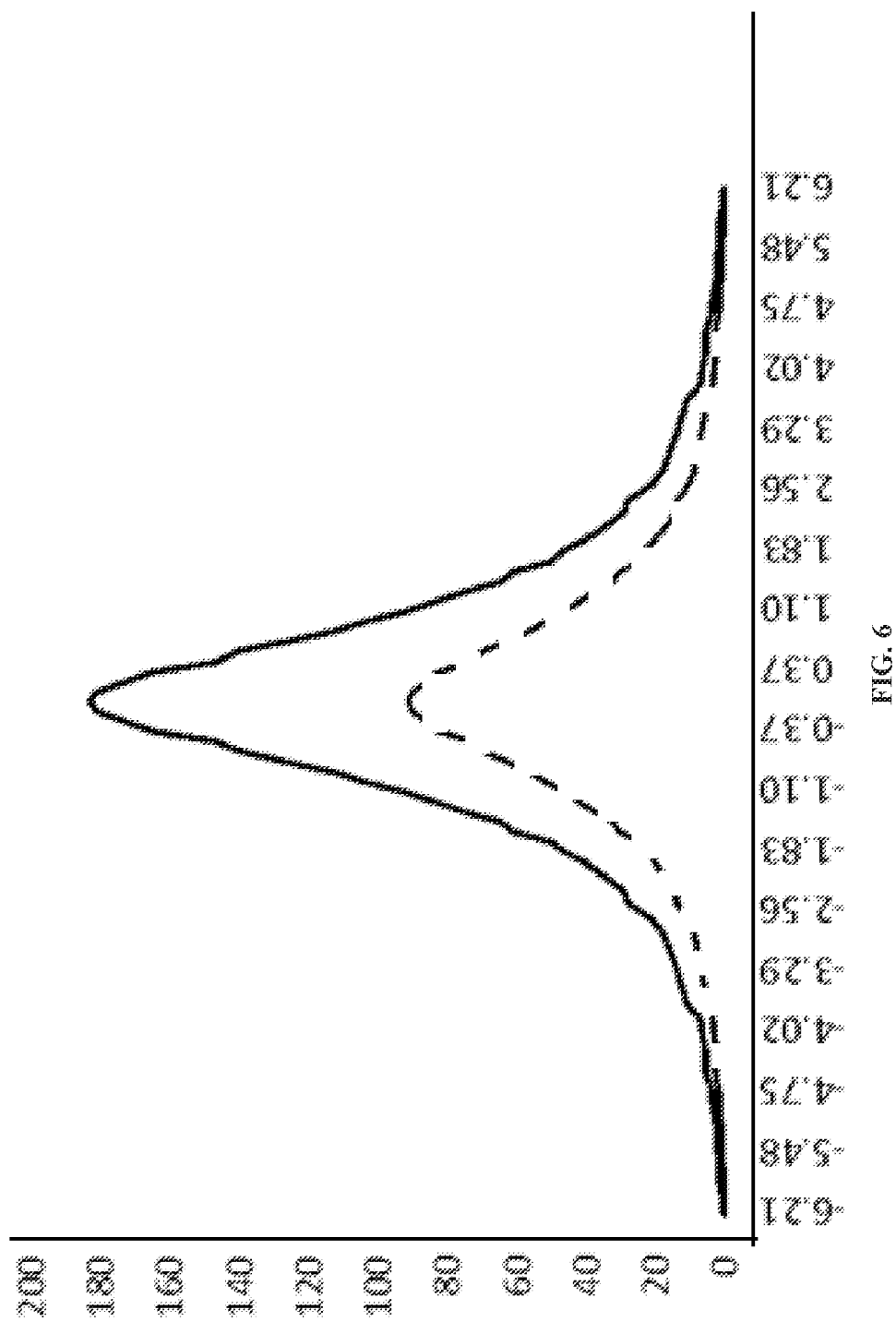
FIG. 6 is a schematic diagram of superimposition of luminance diffusion curves of light-emitting devices in accordance with an embodiment of the present disclosure.

FIG. 6 is a schematic diagram showing superimposition of a luminance diffusion curve in accordance with an embodiment of the present disclosure. Referring to FIG. 6, the dotted lines represent the luminance diffusion curve of the single light-emitting device, the full line represents superimposition of the luminance diffusion curves of two light-emitting devices, the horizontal axis is the distance from d/2 in FIG. 5, and the vertical axis represents luminance.

Figure 7:
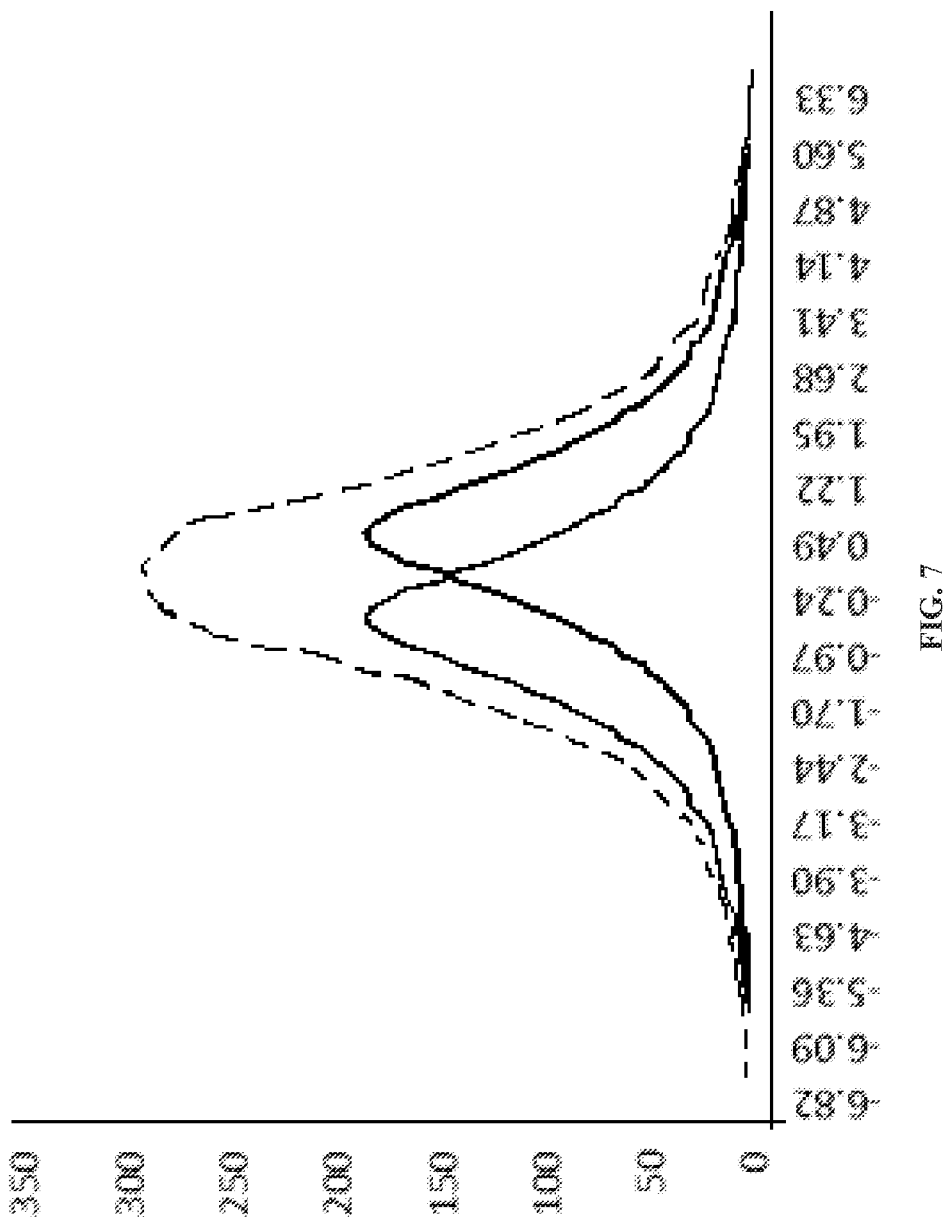
FIG. 7 is a schematic diagram of superimposition of luminance diffusion curves of second partitions in accordance with an embodiment of the present disclosure.

After the luminance diffusion curve of one column of light-emitting devices in FIG. 6 is obtained by superimposition, the luminance diffusion curves of all columns of the light-emitting devices may be superimposed to obtain the luminance diffusion curve of the second partition, as shown in FIG. 7, which is a schematic diagram showing superimposition of the luminance diffusion curve of a second partition in accordance with an embodiment of the present disclosure. Referring to FIG. 7, the dotted lines represent the luminance diffusion curve of the second partition, the full line represents superimposition of the luminance diffusion curves of two columns of the light-emitting devices, the horizontal axis is the distance from the center of the second partition in FIG. 5, and the vertical axis represents luminance.

Exemplarily, the superimposing luminance diffusion curves of the single light-emitting devices in each column to obtain a luminance diffusion curve of each column of light-emitting devices includes the following step.

If the luminance diffusion curves of the plurality of light-emitting devices in the column are the same, the luminance diffusion curve of any light-emitting device in the column may be multiplied by the number of the light-emitting devices in this column to obtain the luminance diffusion curve of this column of light-emitting devices.

In this embodiment, the luminance diffusion curve of one column of light-emitting devices is a luminance diffusion curve in a direction perpendicular to the column around the center of this column of light-emitting devices. For example, the luminance diffusion curve of the column of light-emitting devices on the left side of FIG. 5 is the luminance diffusion curve at d/2 in the middle of the column of light-emitting devices in the horizontal direction.

Exemplarily, the luminance diffusion curves of all the columns of light-emitting devices are superimposed based on the distance between the centers of the corresponding column and the second partition to obtain the luminance diffusion curve of the second partition by calculation through the following formula (1):

$$psf2(x) = \begin{cases} \sum_{i=-b/2}^{b/2} psf1(x+(i-1/2)*\text{pitch}), & b \text{ is an even number} \\ i \neq 0, \\ \sum_{i=-(b-1)/2}^{(b-1)/2} psf1(x+i*\text{pitch}), & b \text{ is an odd number} \end{cases} \quad (1)$$

wherein psf2(x) is the luminance diffusion curve of the second partition, psf1(x) is the luminance diffusion curve of one column of light-emitting devices, pitch is the center distance between the adjacent light-emitting device, b is the number of columns of light-emitting devices in the second partition, x represents the distance to the center of the second partition, i represents the column corresponding to the light-emitting devices in the second partition, and the positive and negative values of i indicate whether the corresponding column is at the left side or the right side of the center of the second partition. For example, when i is negative, it indicates that the column at the left side of the center of the second partition; and when i is positive, it indicates that the column at the right side of the center of the second partition. psf1(x+(i−1/2)*pitch) represents the luminance of a point, x distance from the center of the second partition, of the $i^{th}$ column of light-emitting devices.

When the number of the light-emitting devices in the second partition is greater than 4, the number of the light-emitting devices on one side of the second partition is greater than or equal to 3. At this time, during fitting of the luminance diffusion curve of the second partition, the luminance diffusion curves of the plurality of light-emitting devices in one column are fitted first. That is, the luminance diffusion curves of the plurality of light-emitting devices in this column are directly superimposed. If the luminance diffusion curves of the plurality of light-emitting devices in this column are the same, the luminance diffusion curve of any light-emitting device in this column may be multiplied by the number of the light-emitting devices in this column to obtain the luminance diffusion curve of this column of light-emitting devices. Then, the luminance diffusion curves of the light-emitting devices in this column are fitted by the means illustrated in FIG. 7 that the luminance diffusion curves of all the columns of light-emitting devices are disposed based on the distance from the center of the second partition and then superimposed to obtain the luminance diffusion curve of the second partition.

Exemplarily, during fitting of the luminance diffusion curves of the plurality of columns of light-emitting devices, the luminance diffusion curve of each column of light-emitting devices may be drawn first. Then, the luminance diffusion curve of the column of light-emitting devices is shifted based on the distance between the center of this column of light-emitting devices and the center of the second partition. The shifting direction is associated with the fact that whether the column of light-emitting devices are located on the left side or the right side of the second partition. For example, as shown in FIG. 7, the relative positions of the centers of the two columns of light-emitting devices to the center of the second partition are different. One column of light-emitting devices are located at the left side of the center of the second partition, and the luminance diffusion curve of this column of light-emitting devices is shifted to the left, such that the value of the horizontal axis corresponding to the peak value of the luminance diffusion curves of the light-emitting devices is at the left side of 0 (the location indicating the center of the second partition). Similarly, another column of light-emitting devices are located at the right side of the center of the second partition. Correspondingly, the luminance diffusion curve of this column of light-emitting devices is shifted to the right, such that the value of the horizontal axis corresponding to the peak value of the luminance diffusion curves of the light-emitting devices is at the right side of 0 (the location indicating the center of the second partition). After that, the luminance values of the luminance diffusion curves of the columns of light-emitting devices corresponding to the same distance are added up. The different luminance values corresponding to different distances finally constitute the luminance diffusion curve of the second partition. For example, the luminance values (namely, the values of the vertical axis are added) of the two luminance diffusion curves corresponding to the value 0 of the horizontal axis are added up to obtain the luminance value in the center of the luminance diffusion curves of the second partition.

In step 204, the luminance value of each of the plurality of second partitions of the backlight source is determined based on the gray-scale value of each pixel of the input image.

In the local dynamic dimming algorithm, the backlight luminance may be changed in real time based on the content of a displayed image, reducing the backlight power consumption and improving the image quality contrast. Thus, in this step, the luminance value of each of the plurality of second partitions may be determined based on the gray-scale value of each pixel of the input image.

Exemplarily, when the light-emitting devices in the first partition are partitioned into a plurality of second partitions, an average gray-scale value may be calculated based on the gray-scale value of each pixel corresponding to the first partition. Alternatively, the maximum gray-scale value of the gray-scale values of the pixels corresponding to the first partitions is determined. The average gray-scale value or the maximum gray-scale value is used as the luminance value of the second partition corresponding to the first partition. Since the light-emitting devices in the first partition are controlled synchronously, although the light-emitting devices in the plurality of second partitions obtained by partitioning the first partition belong to different second partitions, the luminance values are still the same. Thus, the luminance values of the light-emitting devices in the second partition need to be determined based on the gray-scale values of the pixels corresponding to the first partitions.

Exemplarily, when the light-emitting devices in the plurality of first partitions are integrated into the second partition, the average gray-scale value may be calculated based on the gray-scale value of the pixel corresponding to the second partition. Alternatively, the maximum gray-scale value of the gray-scale values of the pixels corresponding to the second partitions is determined. The average gray-scale value or the maximum gray-scale value is used as the luminance value of the second partition.

In this embodiment, the pixel refers to a point in the input image and is a part of the input image. The pixel unit refers to a display unit configured to display one pixel in the display panel and is a part of the display panel. The pixel corresponding to the first partition refers to the pixel displayed by the pixel unit right facing the light-emitting devices in the first partition in a direction perpendicular to the display panel. Likewise, the pixel corresponding to the second partition refers to the pixel displayed by the pixel unit right facing the light-emitting devices in the second partition in a direction perpendicular to the display panel.

In the display panel, the pixel units and the first partitions in the backlight source are uniformly distributed. A corresponding relationship between each of the plurality of first partitions and the pixel unit of the display panel may be determined based on the number of the pixel units of the display panel, the number of rows and the number of columns of the pixel units, the number of the first partitions in the backlight source and the number of rows and the number of columns respectively corresponding to a length and a width of the first partition. A corresponding relationship between the second partition and the pixel unit of the display panel may be determined with reference to a corresponding relationship between the first partition and the second partition. The number of rows and the number of columns, respectively corresponding to the length and the width of the first partition, may be obtained by conversion based on the length and the width of the first partition, the size of a display region of the display panel and the number of rows and the number of columns of the pixel units.

In step 205, a distance between the center of each of the plurality of second partitions and the pixel unit is determined with respect to each pixel in the input image. A weight value of each of the plurality of second partitions in the backlight value of the pixel unit is determined based on the luminance diffusion curve of each of the plurality of second partitions and the distance between the center of each of the plurality of second partitions and the pixel unit.

In the display panel, the pixel units and the light-emitting devices in the backlight source are uniformly distributed. A corresponding relationship between each of the plurality of second partitions and the pixel unit of the display panel may be determined based on the number of the pixel units of the display panel, the number of rows and the number of columns of the pixel units, the number of the second partitions in the backlight source and the number of rows and the number of columns corresponding to a side length of the second partition. For example, a distance between each pixel unit and the center of each of the plurality of second partitions is determined based on the second partitions where the pixel units are and their locations in the second partitions.

In step 203, the luminance diffusion curves of the second partitions are obtained and indicate the luminance of the second partitions at different distances. The weight value of each of the plurality of second partitions in the backlight value of each pixel unit may be determined with reference to the distance between each pixel unit and the center of each of the plurality of second partitions.

In step 205, the weight value of the second partition may be determined by the following means:

based on a distance between the pixel unit and the center of the corresponding second partition, searching for a luminance value, corresponding to the distance, on the luminance diffusion curve of the corresponding second partition; and determining a weight value of the corresponding second partition in the backlight value of the pixel unit based on the luminance value.

The weight value may be calculated by the following means: dividing the luminance value by the maximum luminance value on the luminance diffusion curve of the second partition to obtain a specific value that is used as the weight value; or setting a corresponding relationship between the luminance value and the weight value in advance, and determining the weight value by searching for the corresponding relationship between the luminance value and the weight value.

The luminance value corresponding to the distance between the pixel and the center of the second partition is searched on the luminance diffusion curves of the second partitions shown in FIG. 7. For example, the luminance value is 220 when the distance is 0.97, and 220 is then divided by the maximum luminance value 300 on the luminance diffusion curve to obtain the weight value of 0.733.

In step 206, a backlight value of the pixel unit corresponding to each pixel on the display panel is calculated based on the luminance value of each of the plurality of second partitions of the backlight source and the weight value of each of the plurality of second partitions in the backlight value of each pixel unit.

Here, the backlight value refers to the luminance value of light emitted by the backlight source at the pixel unit on the display panel. The backlight value of each pixel unit is calculated by the following means: the weight value of each of the plurality of second partitions corresponding to the pixel unit and the luminance value of the corresponding second partition are multiplied to obtain an effective luminance value of each of the plurality of second partitions; and the effective luminance values of all the second partitions are added up to obtain the backlight value of the pixel unit.

The second partition corresponding to one pixel unit may be selected by the following means: a second partition of which the weight value is higher than a threshold is chosen as a second partition corresponding to the pixel. Since a large number of second partitions may be arranged, and a partition with an extremely low weight causes less impact to the backlight value of the pixel unit, when the second partitions with low weights are removed, calculation of the backlight value is almost not affected. Moreover, the data processing amount may be greatly reduced.

In steps 204 to 206, the backlight value of each pixel unit is determined based on the luminance diffusion curve of the second partition and the gray-scale value of each pixel of the input image. In this implementation manner, one second partition is regarded as a light-emitting point. The weight value between this point and each pixel unit is obtained based on the luminance diffusion curve. The backlight value of the pixel unit corresponding to each pixel on the display panel is calculated by the weight value. The backlight value is used as a basis for subsequent compensation.

In step 207, a gray-scale value of each pixel of the input image is acquired.

The input image includes a plurality of pixels. Each pixel has a corresponding gray-scale value. The gray-scale value is to indicate the luminance of the pixel.

In step 208, a compensated gray-scale value of each pixel of the input image is calculated based on the gray-scale value of each pixel of the input image and the backlight value of each pixel unit. A display panel is controlled to display the input image based on the compensated gray-scale value of each pixel of the input image.

In an implementation manner of this embodiment, step 208 may include:

calculating a compensated gray-scale value of each pixel of the input image based on the following formula:

$$V_{com}=V_{ori}\times(255/bl\_pix)^{1/2.2} \quad (2), \text{ wherein}$$

$V_{ori}$ is the gray-scale value of the input image;
$V_{com}$ is the compensated gray-scale value of the pixel corresponding to $V_{ori}$; and bl_pix is the backlight value of the pixel unit corresponding to $V_{ori}$.

In this formula, the gray-scale value of the pixel of the input image and the backlight value of the pixel unit of the second partition are drawn into consideration to ensure a picture compensation effect.

After finish of compensation, the display device may be controlled to display an image based on the compensated gray-scale value.

In steps 207 and 208, picture compensation is performed based on the backlight value of each pixel unit. By this means, picture compensation may be accomplished, such that an image has the display effects of high contrast and low distortion factor. Thus, the image quality is ensured.

This embodiment provides the method for picture compensation when the luminance equipotential line of the single region is not perfectly circular. According to the method, the plurality of first partitions are partitioned based on the information of the plurality of first partitions, such that the number of rows and the number of columns of the light-emitting devices in the second partition are the same. Thus, the luminance equipotential line of the second partition is truly circular. The PSFs of the single partition are different in all directions. Therefore, the difficulty of a compensation algorithm is reduced. The accuracy of a compensation value and the overall display effect are improved.

Figure 8:
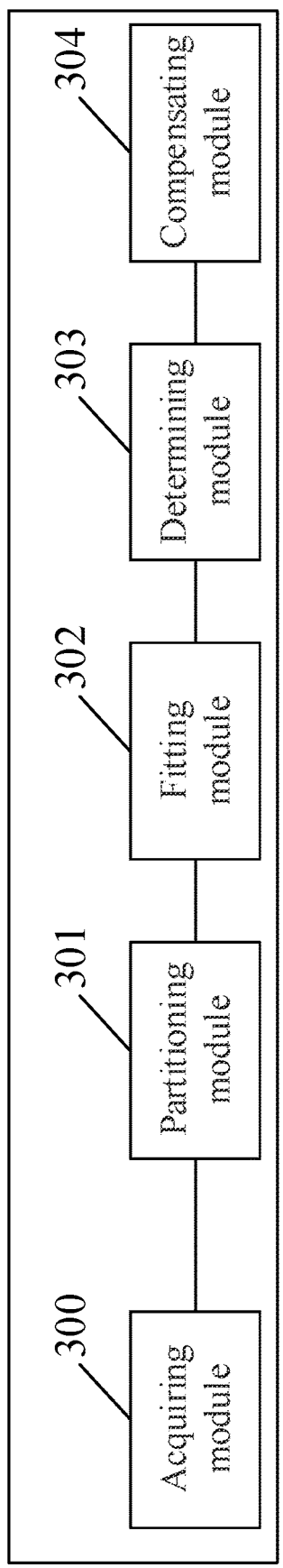
FIG. 8 is a schematic structural diagram of a picture compensation apparatus in accordance with an embodiment of the present disclosure.

FIG. 8 is a schematic structural diagram of a picture compensation apparatus in accordance with an embodiment of the present disclosure. Referring to FIG. 8, the picture compensation apparatus includes an acquiring module 300, a partitioning module 301, a fitting module 302, a determining module 303 and a compensating module 304.

The acquiring module 300 is configured to acquire a gray-scale value of each pixel of an input image of a display device, information of a plurality of first partitions of a backlight source of the display device and a luminance diffusion curve of each light-emitting device in each of the plurality of first partitions. The first partition includes a plurality of synchronously controlled light-emitting devices of which the number of rows and the number of columns are not equal. The partitioning module 301 is configured to partition the light-emitting devices in the plurality of first partitions to obtain a plurality of second partitions. The number of rows and the number of columns of light-emitting devices in each of the plurality of second partitions are n, which is a positive integer. That is, the number of rows and the number of columns of light-emitting devices in each of the plurality of second partitions are equal. The fitting module 302 is configured to, with regard to each of the plurality of second partitions, fit a luminance diffusion curve of each of the plurality of second partitions based on the luminance diffusion curve of each light-emitting device in each of the plurality of first partitions. The determining module 303 is configured to determine a backlight value of a pixel unit corresponding to each pixel on a display panel based on the luminance diffusion curve of each of the plurality of second partitions and the gray-scale value of each pixel of the input image. The compensating module 304 is configured to compensate for the input image based on the backlight value of each pixel unit.

In an implementation manner of this embodiment, the partitioning module 301 is configured to: determine the number of rows and the number of columns of light-emitting devices in each of the plurality of first partitions based on the information of the corresponding first partition; and re-partition the light-emitting devices in the plurality of first partitions by taking any of a greatest common divisor and a least common multiple of the number of rows and the number of columns of the light-emitting devices in the first partitions as the number of rows and the number of columns of the light-emitting devices in the second partition.

In an implementation manner of this embodiment, the fitting module 302 is configured to: directly take a luminance diffusion curve of the single light-emitting device as a luminance diffusion curve of the second partition when n=1, namely when the number of rows and the number of columns of the light-emitting devices in the second partition are equal to 1; and superimpose the luminance diffusion curves of all the light-emitting devices in the second partition to obtain a luminance diffusion curve of the second partition when n≠1, namely, when the number of rows and the number of columns of the light-emitting devices in the second partition are not equal to 1.

In an implementation manner of this embodiment, the determining module 303 is configured to: determine a luminance value of each of the plurality of second partitions of the backlight source based on a gray-scale value of each pixel of the input image; for each pixel in the input image, determine a distance between the center of each of the plurality of second partitions and the pixel unit, and determine a weight value of each of the plurality of second partitions in the backlight value of the pixel unit based on the luminance diffusion curve of each of the plurality of second partitions and the distance between the center of each of the plurality of second partitions and the pixel unit; and calculate a backlight value of the pixel unit corresponding to each pixel on the display panel based on the luminance value of each of the plurality of second partitions of the backlight source and the weight value of each of the plurality of second partitions in the backlight value of each pixel unit.

In an implementation manner of this embodiment, the compensating module 304 is configured to calculate a compensated gray-scale value of each pixel of the input image based on the gray-scale value of each pixel of the input image and the backlight value of each pixel unit, and control a display panel to display the input image based on the compensated gray-scale value of each pixel of the input image.

In an implementation manner of this embodiment, the compensating module 304 is configured to calculate a compensated gray-scale value of each pixel of the input image based on the foregoing formula (2).

With regard to the device in the above embodiments, the specific ways in which the respective modules perform operations have been described in detail in the embodiments related to the method, and thus, will not be explained in detail herein.

Figure 9:
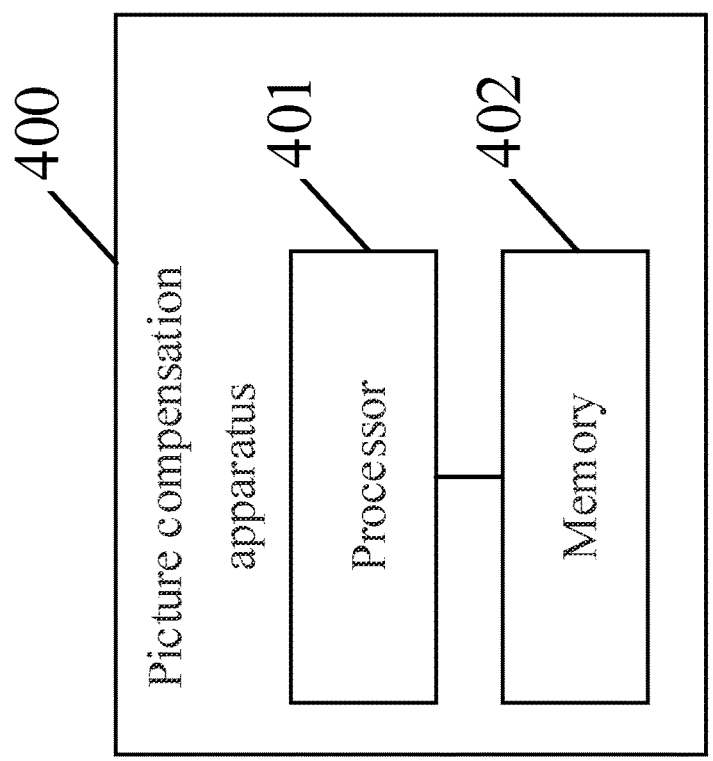
FIG. 9 is a structural block diagram of a picture compensation apparatus in accordance with an embodiment of the present disclosure.

An embodiment of the present disclosure provides a picture compensation apparatus 400. As shown in FIG. 9, the picture compensation apparatus 400 includes:

a processor 401; and a memory 402 configured to store an instruction executable by the processor.

The processor is configured to perform any of the picture compensation methods according to the above embodiments.

Figure 10:
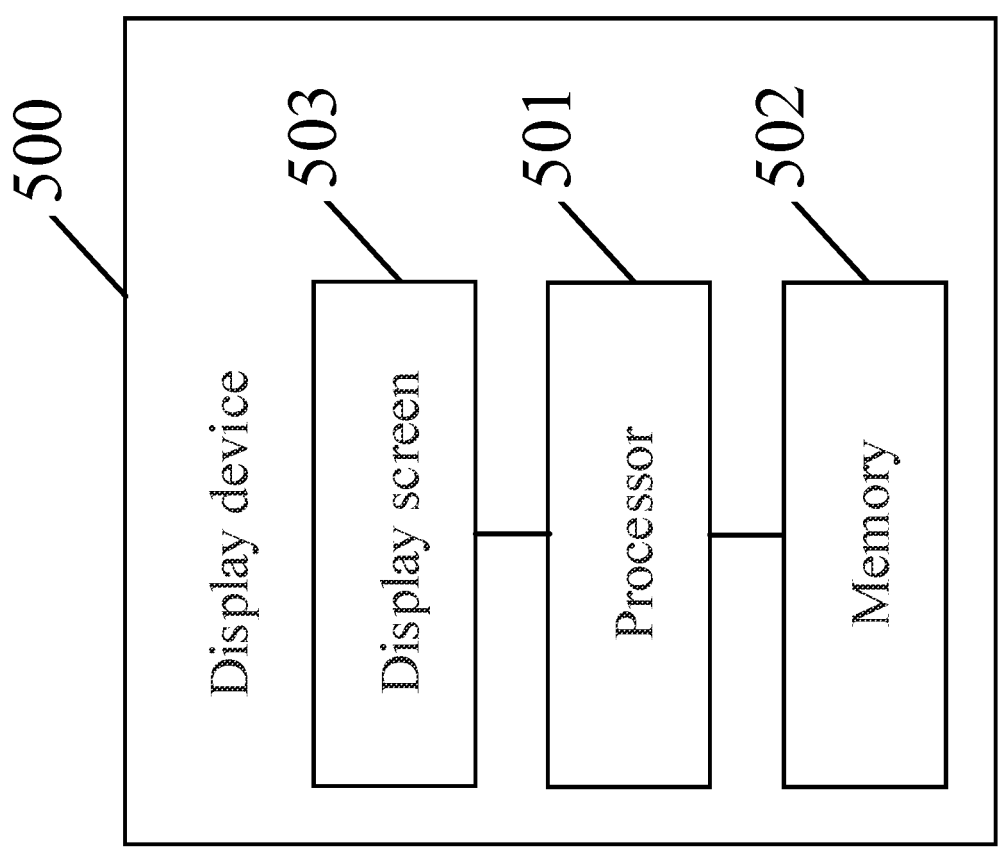
FIG. 10 is a structural block diagram of a display device in accordance with an embodiment of the present disclosure.

An embodiment of the present disclosure further provides a display device. The display device includes the picture compensation apparatus illustrated in FIG. 8. FIG. 9 or FIG. 10.

FIG. 10 is a structural block diagram of a display device 500 in accordance with an embodiment of the present disclosure. As shown in FIG. 10, the display device includes:

a processor 501;

a memory 502 configured to store an instruction executable by the processor; and a display screen 503 configured to display an image under control of the processor 501 and provided with a backlight source.

The processor is configured to perform any of the picture compensation methods provided by the foregoing embodiments.

Exemplarily, the display screen 503 is a liquid crystal display screen, and the backlight source is a direct-lit dot matrix backlight source.

In this embodiment, the provided display device may be any product or component with a display function, such as a mobile phone, a tablet PC, a television, a display, a laptop, a digital photo frame or a navigator.

Figure 11:
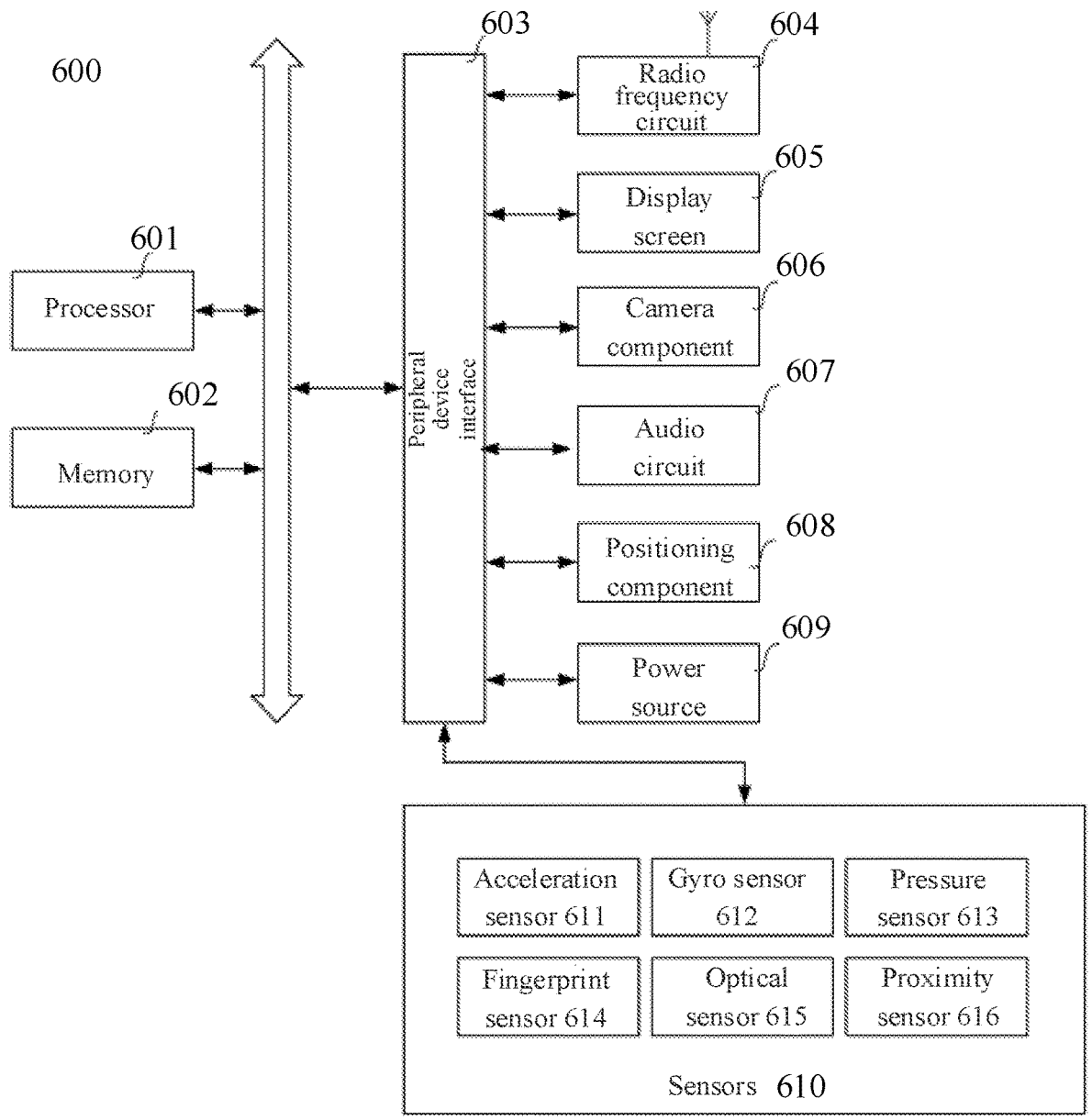

FIG. 11 is a structural block diagram of a display device 600 in accordance with an embodiment of the present disclosure. Generally, the display device 600 includes a processor 601 and a memory 602.

The processor 601 may include one or more processing cores, such as a 4-core processor and an 8-core processor. The processor 601 may be formed by at least one hardware form of a digital signal processor (DSP), a field-programmable gate array (FPGA), and a programmable logic army (PLA). The processor 601 may also include a main processor and a coprocessor. The main processor is a processor for processing data in an awaken state, and is also called a central processing unit (CPU). The coprocessor is a low-power-consumption processor for processing data in a standby state. In some embodiments, the processor 601 may be integrated with a graphics processing unit (GPU), which is responsible for rendering and drawing of the content that needs to be displayed by a display screen. In some embodiments, the processor 601 may also include an artificial intelligence (A) processor for processing the computational operations related to machine learning.

The memory 602 may include one or more computer-readable storage mediums, which may be non-transitory. The memory 602 may also include a high-speed random access memory, as well as a non-transitory memory, such as one or more disk storage devices and flash storage devices. In some embodiments, the non-transitory computer-readable storage medium in the memory 602 is configured to store at least one instruction. The at least one instruction is configured to be executed by the processor 601 to perform the method according to the method embodiments of the present disclosure.

In this embodiment, the display device 600 also optionally includes a peripheral device interface 603 and at least one peripheral device. The processor 601, the memory 602, and the peripheral device interface 603 may be connected by a bus or a signal line. Each peripheral device may be connected to the peripheral device interface 603 by a bus, a signal line or a circuit board. The peripheral device interface 603 may be configured to connect at least one peripheral device associated with an input/output (I/O) to the processor 601 and the memory 602. Specifically, the peripheral device includes a display screen 605. The display screen 605 is configured to display an image under the control of the processor 601 and provided with a backlight source. The display screen may also be configured to display a UI (User Interface). The UI may include graphics, text, icons, videos, and any combination thereof.

In some embodiments, the peripheral device may also include at least one of a radio frequency circuit 604, a camera component 606, an audio circuit 607, a positioning component 608, and a power source 609. The radio frequency circuit 604 is configured to receive and transmit an RF (Radio Frequency) signal, which is also referred to as an electromagnetic signal. The radio frequency circuit 604 communicates with a communication network and other communication devices via the electromagnetic signal. The radio frequency circuit 604 converts the electrical signal into the electromagnetic signal for transmission, or converts the received electromagnetic signal into the electrical signal. The camera component 606 is configured to capture images or videos. Optionally, the camera component 606 includes a front camera and a rear camera. The audio circuit 607 may include a microphone and a speaker. The microphone is configured to collect acoustic waves from a user and an environment, and convert the acoustic waves into electrical signals which are input to the processor 601 for processing, or input to the RF circuit 604 for voice communication. The positioning component 608 is configured to locate the current geographic location of the display device 600 to implement navigation or a location base service (LBS). The power source 609 is configured to power various components in the display device 600. The power source 609 may be an alternating current, a direct current, a disposable battery, or a rechargeable battery.

In some embodiments, the display device 600 also includes one or more sensors 610. The one or more sensors 610 include, but not limited to, an acceleration sensor 611, a gyro sensor 612, a pressure sensor 613, a fingerprint sensor 614, an optical sensor 615, and a proximity sensor 616.

It may be understood by those skilled in the art that the structure shown in FIG. 11 does not constitute any limitation to the display device 600, and may include more or less components than those illustrated, or combine some components or employ different component arrangements.

In an exemplary embodiment, a non-transitory computer-readable storage medium including instructions, such as a memory including the instructions, is provided. The instructions are executable by a processor of a server to perform the picture compensation method according to various embodiments of the present disclosure. For example, the non-transitory computer-readable storage medium may be a ROM, a random-access memory (RAM), a CD-ROM, a magnetic tape, a floppy disk, an optical data storage device or the like Detailed above are only preferred embodiments of the present disclosure, and are not intended to limit the present disclosure. Within the spirit and principles of the disclosure, any modifications, equivalent substitutions, improvements and the like are within the protection scope of the present disclosure.

What is claimed is:

1. A picture compensation method, comprising:
    acquiring information of a plurality of first partitions of a backlight source of a display device, wherein the first partition comprises a plurality of synchronously controlled light-emitting devices of which the number of rows and the number of columns are not equal, and the information of the first partition at least comprises information of the number of rows and information of the number of columns of the light-emitting devices in the first partition;
    partitioning the light-emitting devices of the plurality of first partitions based on the information of the plurality of partitions to obtain a plurality of second partitions, wherein the number of rows and the number of columns of light-emitting devices in each of the plurality of second partitions are equal;
    acquiring a gray-scale value of each pixel of an input image of the display device and a luminance diffusion curve of each light-emitting device in each of the plurality of first partitions;
    fitting a luminance diffusion curve of each of the plurality of second partitions based on the luminance diffusion curve of each light-emitting device in each of the plurality of first partitions;
    determining a backlight value of a pixel unit corresponding to each pixel on a display panel based on the luminance diffusion curve of each of the plurality of second partitions and the gray-scale value of each pixel of the input image; and
    compensating for a picture of the input image based on the backlight value of each pixel unit;
    wherein the fitting a luminance diffusion curve of each of the plurality of second partitions based on the luminance diffusion curve of each light-emitting device in each of the plurality of first partitions comprises:
        in columns, superimposing the luminance diffusion curves of the single light-emitting devices in each column to obtain a luminance diffusion curve of each column of light-emitting devices when the number of rows and the number of columns of the light-emitting devices in the second partition are not equal to 1; and
        superimposing the luminance diffusion curve of each column of light-emitting devices based on a distance between the centers of the corresponding column of light-emitting devices and the second partition to obtain the luminance diffusion curve of the second partition.

2. The method according to claim 1, the partitioning the light-emitting devices of the plurality of first partitions based on the information of the plurality of first partitions to obtain a plurality of second partitions comprises:
    determining the number of rows and the number of columns of light-emitting devices in each of the plurality of first partitions based on the information of the corresponding first partition; and
    re-partitioning the light-emitting devices in the plurality of first partitions by taking any of a greatest common divisor and a least common multiple of the number of rows and the number of columns of the light-emitting devices in the first partition as the number of rows and the number of columns of the light-emitting devices in the second partition.

3. The method according to claim 2, wherein the re-partitioning the light-emitting devices in the plurality of first partitions by taking any of a greatest common divisor and a least common multiple of the number of rows and the number of columns of the light-emitting devices in the first partitions as the number of rows and the number of columns of the light-emitting devices in the second partition is implemented by any of the following means:
    partitioning the light-emitting devices in the first partition into the plurality of second partitions by taking the greatest common divisor as the number of rows and the number of columns of the light-emitting devices in the second partition;
    partitioning the light-emitting devices in the first partition into the plurality of second partitions by taking the greatest common divisor as the number of rows and the number of columns of the light-emitting devices in the second partition when the greatest common divisor is not 1;

integrating the light-emitting devices in the plurality of first partitions into one of the second partitions by taking the least common multiple as the number of rows and the number of columns of the light-emitting devices in the second partition when the greatest common divisor is 1;

integrating the light-emitting devices in the plurality of first partitions into one of the second partitions by taking the least common multiple as the number of rows and the number of columns of the light-emitting devices in the second partition if the least common multiple is not greater than a threshold when the greatest common divisor is 1; and partitioning the light-emitting devices in the first partitions into the plurality of second partitions by taking the greatest common divisor as the number of rows and the number of columns of the light-emitting devices in the second partitions if the least common multiple is greater than the threshold when the greatest common divisor is 1.

4. The method according to claim 1, wherein the fitting a luminance diffusion curve of each of the plurality of second partitions based on the luminance diffusion curve of each light-emitting device in each of the plurality of first partitions further comprises:

directly taking a luminance diffusion curve of the single light-emitting device as a luminance diffusion curve of the second partition when the number of rows and the number of columns of the light-emitting devices in the second partition are equal to 1.

5. The method according to claim 1, wherein the determining a backlight value of a pixel unit corresponding to each pixel on a display panel based on the luminance diffusion curve of each of the plurality of second partitions and the gray-scale value of each pixel of the input image comprises:

determining a luminance value of each of the plurality of second partitions of the backlight source based on a gray-scale value of each pixel of the input image;

for each pixel in the input image, determining a distance between the center of each of the plurality of second partitions and the pixel unit, and determining a weight value of each of the plurality of second partitions in the backlight value of the pixel unit based on the luminance diffusion curve of each of the plurality of second partitions and the distance between the center of each of the plurality of second partitions and the pixel unit; and calculating a backlight value of the pixel unit corresponding to each pixel on the display panel based on the luminance value of each of the plurality of second partitions of the backlight source and the weight value of each of the plurality of second partitions in the backlight value of each pixel unit.

6. The method according to claim 5, wherein the determining a weight value of each of the plurality of second partitions in the backlight value of the pixel unit based on the luminance diffusion curve of each of the plurality of second partitions and the distance between the center of each of the plurality of second partitions and the pixel unit comprises:

based on a distance between the pixel unit and the center of the corresponding second partition, searching for a luminance value corresponding to the distance on the luminance diffusion curve of the corresponding second partition; and determining a weight value of the corresponding second partition in the backlight value of the pixel unit based on the searched luminance value.

7. The method according to claim 1, wherein the compensating for a picture of the input image based on the backlight value of each pixel unit comprises:

calculating a compensated gray-scale value of each pixel of the input image based on the gray-scale value of each pixel of the input image and the backlight value of each pixel unit, and controlling a display panel to display the input image based on the compensated gray-scale value of each pixel of the input image.

8. The method according to claim 7, wherein the calculating a compensated gray-scale value of each pixel of the input image based on the gray-scale value of each pixel of the input image and the backlight value of each pixel unit comprises:

calculating a compensated gray-scale value of each pixel of the input image based on the following formula:

$V_{com} = V_{ori} \times (255/bl\_pix)^{1/2.2}$, wherein $V_{ori}$ is the gray-scale value of the input image;
$V_{com}$ is the compensated gray-scale value of the pixel corresponding to $V_{ori}$; and
bl_pix is the backlight value of the pixel unit corresponding to $V_{ori}$.

9. A non-transitory computer-readable storage medium, wherein a picture compensation apparatus is capable of performing the picture compensation method as defined in claim 1 when an instruction in the non-transitory computer-readable storage medium is executed by a processor in the picture compensation apparatus.

10. An apparatus for use in picture compensation, comprising:

a processor; and
a memory configured to store an instruction executable by the processor;
wherein the processor is configured to:
acquire a gray-scale value of each pixel of an input image of a display device, information of a plurality of first partitions of a backlight source of the display device and a luminance diffusion curve of each light-emitting device in each of the plurality of first partitions, wherein the first partition comprises a plurality of synchronously controlled light-emitting devices of which the number of rows and the number of columns are not equal, and the information of the first partition at least comprises information of the number of rows and information of the number of columns of the light-emitting devices in the first partition;
partition the light-emitting devices of the backlight source based on the information of the plurality of first partitions to obtain a plurality of second partitions, wherein the number of rows and the number of columns of light-emitting devices in each of the plurality of second partitions are equal;
with regard to each of the plurality of second partitions, fit a luminance diffusion curve of each of the plurality of second partitions based on the luminance diffusion curve of each light-emitting device in each of the plurality of first partitions;
determine a backlight value of a pixel unit corresponding to each pixel on a display panel based on the luminance diffusion curve of each of the plurality of second partitions and the gray-scale value of each pixel of the input image; and compensate for a picture of the input image based on the backlight value of each pixel unit;
wherein the processor is further configured to:
in columns, superimpose the luminance diffusion curves of the single light-emitting devices in each column to obtain a luminance diffusion curve of each column of light-emitting devices when the number of rows and the number of columns of the light-emitting devices in the second partition are not equal to 1; and
superimpose the luminance diffusion curves of each column of light-emitting devices based on a distance between the centers of the corresponding column of light-emitting devices and the second partition to obtain the luminance diffusion curve of the second partition.

11. A display device, comprising
a processor;
a memory configured to store an instruction executable by the processor; and
a display screen configured to display an image under control of the processor and provided with a backlight source;
wherein the processor is configured to:
acquire information of a plurality of first partitions of the backlight source, wherein the first partition comprises a plurality of synchronously controlled light-emitting devices of which the number of rows and the number of columns are not equal, and the information of the first partition at least comprises information of the number of rows and information of the number of columns of the light-emitting devices in the first partition;
partition the light-emitting devices in the plurality of first partitions based on the information of the plurality of first partitions to obtain a plurality of second partitions, wherein the number of rows and the number of columns of light-emitting devices in each of the plurality of second partitions are equal;
acquire a gray-scale value of each pixel of an input image of the display device and a luminance diffusion curve of each light-emitting device in each of the plurality of first partitions;
with regard to each of the plurality of second partitions, fit a luminance diffusion curve of each of the plurality of second partitions based on the luminance diffusion curve of each light-emitting device in each of the plurality of first partitions;
determine a backlight value of a pixel unit corresponding to each pixel on a display panel based on the luminance diffusion curve of each of the plurality of second partitions and the gray-scale value of each pixel of the input image; and
compensate for a picture of the input image based on the backlight value of each pixel unit;
wherein the processor is further configured to:
in columns, superimpose the luminance diffusion curves of the single light-emitting devices in each column to obtain a luminance diffusion curve of each column of light-emitting devices when the number of rows and the number of columns of the light-emitting devices in the second partition are not equal to 1; and
superimpose the luminance diffusion curves of each column of light-emitting devices based on a distance between the centers of the corresponding column of light-emitting devices and the second partition to obtain the luminance diffusion curve of the second partition.

12. The display device according to claim 11, wherein the processor is further configured to:
determine the number of rows and the number of columns of light-emitting devices in each of the plurality of first partitions based on the information of the corresponding first partition; and
re-partition the light-emitting devices in the plurality of first partitions by taking any of a greatest common divisor and a least common multiple of the number of rows and the number of columns of the light-emitting devices in the first partitions as the number of rows and the number of columns of the light-emitting devices in the second partition.

13. The display device according to claim 12, wherein the processor is further configured to:
re-partition the light-emitting devices of the backlight source by any of the following means:
partition the light-emitting devices in the first partitions into the plurality of second partitions by taking the greatest common divisor as the number of rows and the number of columns of the light-emitting devices in the second partition;
partition the light-emitting devices in the first partitions into the plurality of second partitions by taking the greatest common divisor as the number of rows and the number of columns of the light-emitting devices in the second partition when the greatest common divisor is not 1;
integrate the light-emitting devices in the plurality of first partitions into one of the second partitions by taking the least common multiple as the number of rows and the number of columns of the light-emitting devices in the second partition when the greatest common divisor is 1;
integrate the light-emitting devices in the plurality of first partitions into one of the second partitions by taking the least common multiple as the number of rows and the number of columns of the light-emitting devices in the second partition if the least common multiple is not greater than a threshold when the greatest common divisor is 1; and
partition the light-emitting devices in the first partitions into the plurality of second partitions by taking the greatest common divisor as the number of rows and the number of columns of the light-emitting devices in the second partition if the least common multiple is greater than the threshold when the greatest common divisor is 1.

14. The display device according to claim 11, wherein the processor is further configured to:
directly take a luminance diffusion curve of the single light-emitting device as a luminance diffusion curve of the second partition when the number of rows and the number of columns of the light-emitting devices in the second partition are equal to 1.

15. The display device according to claim 11, wherein the processor is further configured to:
determine a luminance value of each of the plurality of second partitions of the backlight source based on a gray-scale value of each pixel of the input image;
for each pixel in the input image, determine a distance between the center of each of the plurality of second partitions and the pixel unit, and determine a weight value of each of the plurality of second partitions in the backlight value of the pixel unit based on the luminance curve of each of the plurality of second partitions and the distance between the center of each of the plurality of second partitions and the pixel unit; and calculate a backlight value of the pixel unit corresponding to each pixel on the display panel based on the luminance value of each of the plurality of second partitions of the backlight source and the weight value of each of the plurality of second partitions in the backlight value of each pixel unit.

16. The display device according to claim 15, wherein the processor is further configured to:

based on a distance between the pixel unit and the center of the corresponding second partition, search for a luminance value corresponding to the distance on the luminance diffusion curve of the corresponding second partition; and determine a weight value of the corresponding second partition in the backlight value of the pixel unit based on the searched luminance value.

17. The display device according to claim 11, wherein the processor is further configured to:

calculate a compensated gray-scale value of each pixel of the input image based on the gray-scale value of each pixel of the input image and the backlight value of each pixel unit, and control a display panel to display the input image based on the compensated gray-scale value of each pixel of the input image.

18. The display device according to claim 17, wherein the processor is further configured to:

calculate a compensated gray-scale value of each pixel of the input image based on the following formula:

$V_{com} = V_{ori}(255/bl\_pix)^{1/2.2}$, wherein $V_{ori}$ is the gray-scale value of the input image;

$V_{com}$ is the compensated gray-scale value of the pixel corresponding to $V_{ori}$; and bl_pix is the backlight value of the pixel unit corresponding to $V_{ori}$.

* * * * *